June 22, 1971 T. A. WELLS 3,586,575
APPARATUS FOR POSITIONING AN ENDLESS BELT ON A TIRE CARCASS
Filed April 7, 1969 4 Sheets-Sheet 1
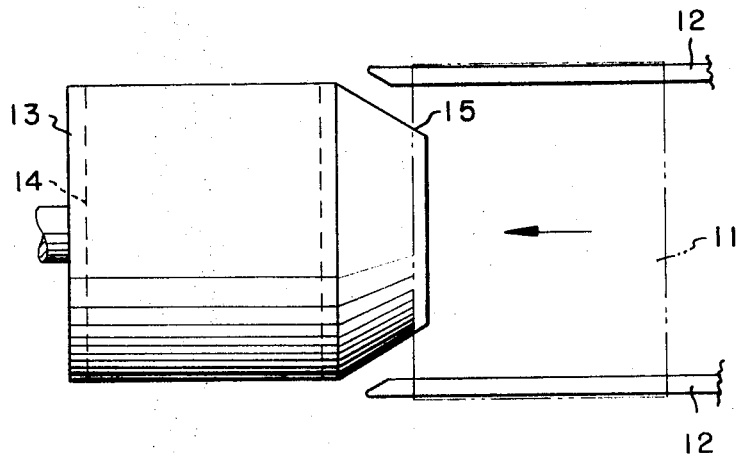
FIG.-1-
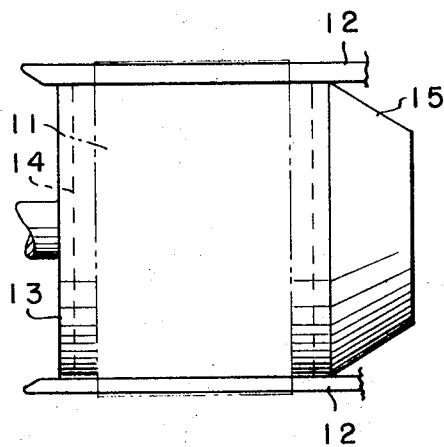
FIG.-2-
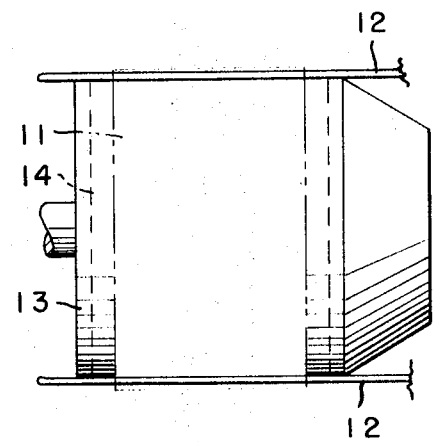
FIG.-3-
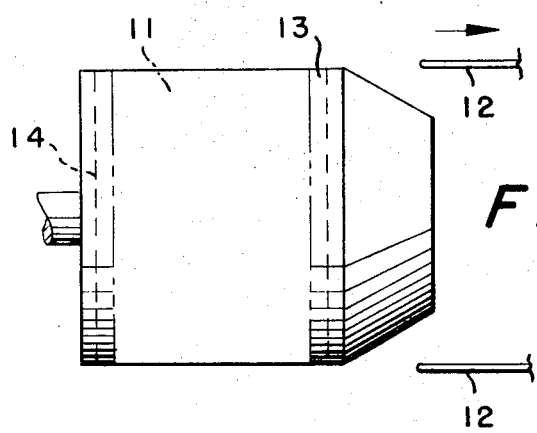
FIG.-4-
INVENTOR.
THOMAS A. WELLS
BY
ATTORNEY

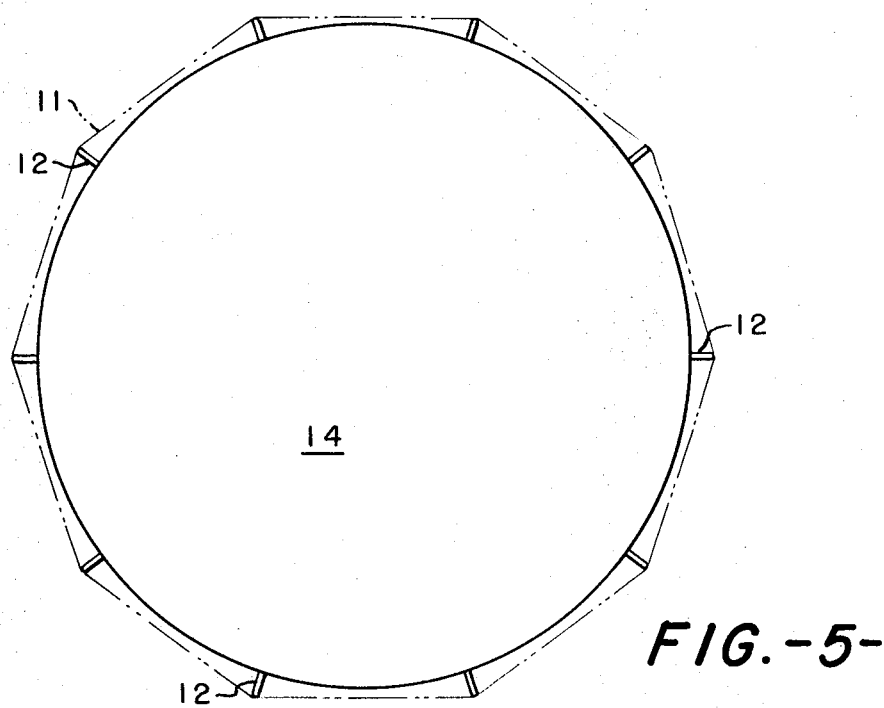
FIG.-5-
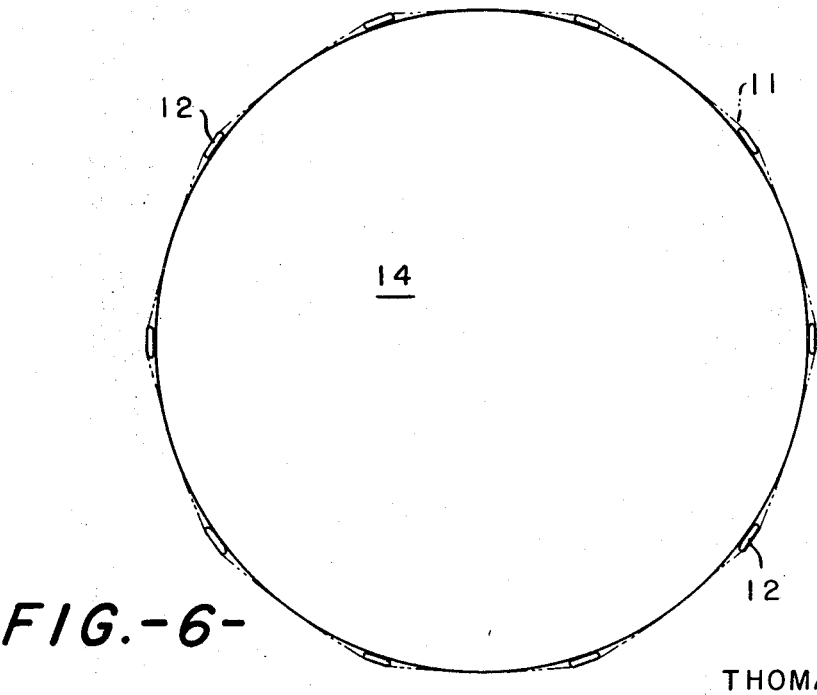
FIG.-6-

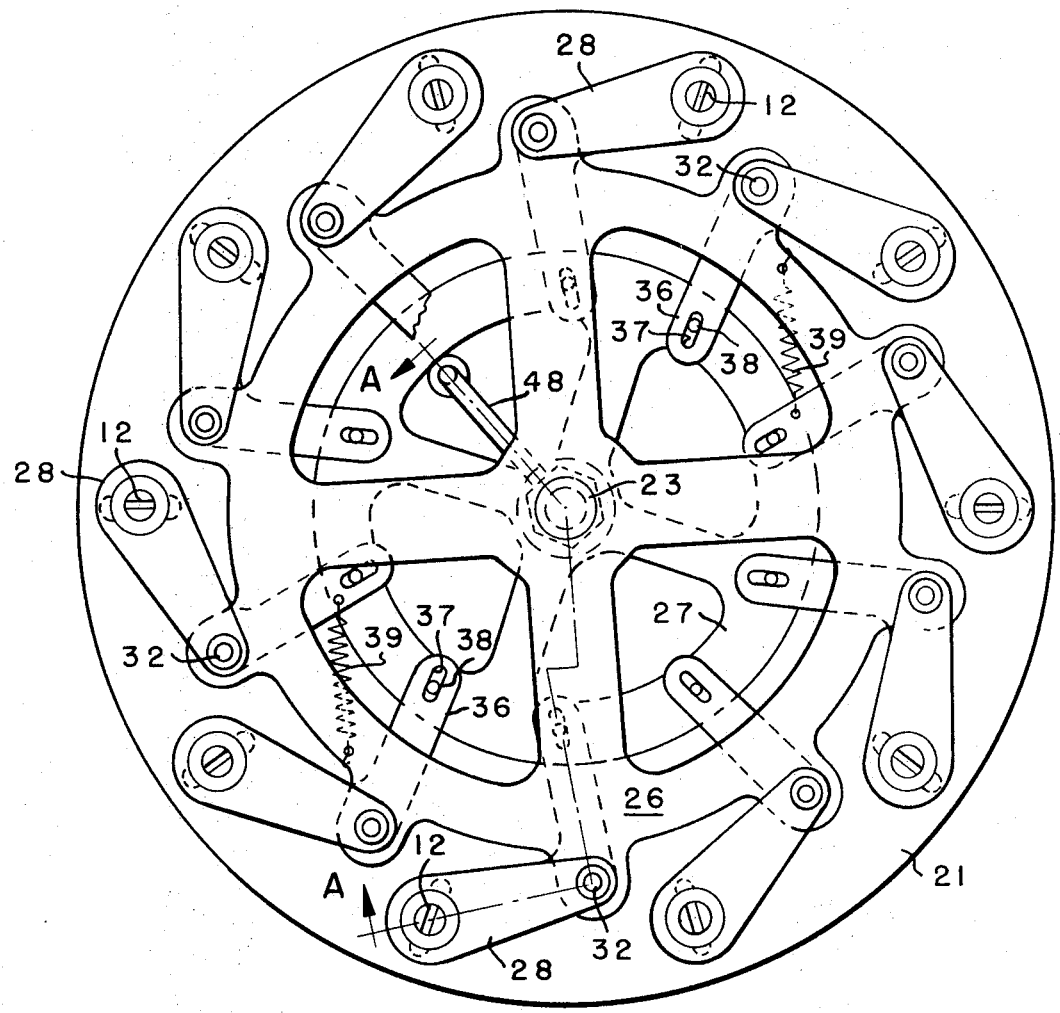
FIG.-7-
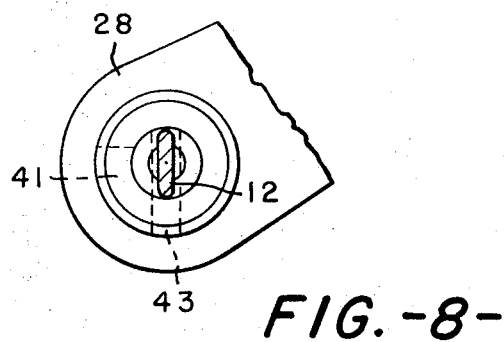
FIG.-8-
INVENTOR.
THOMAS A. WELLS
BY
ATTORNEY

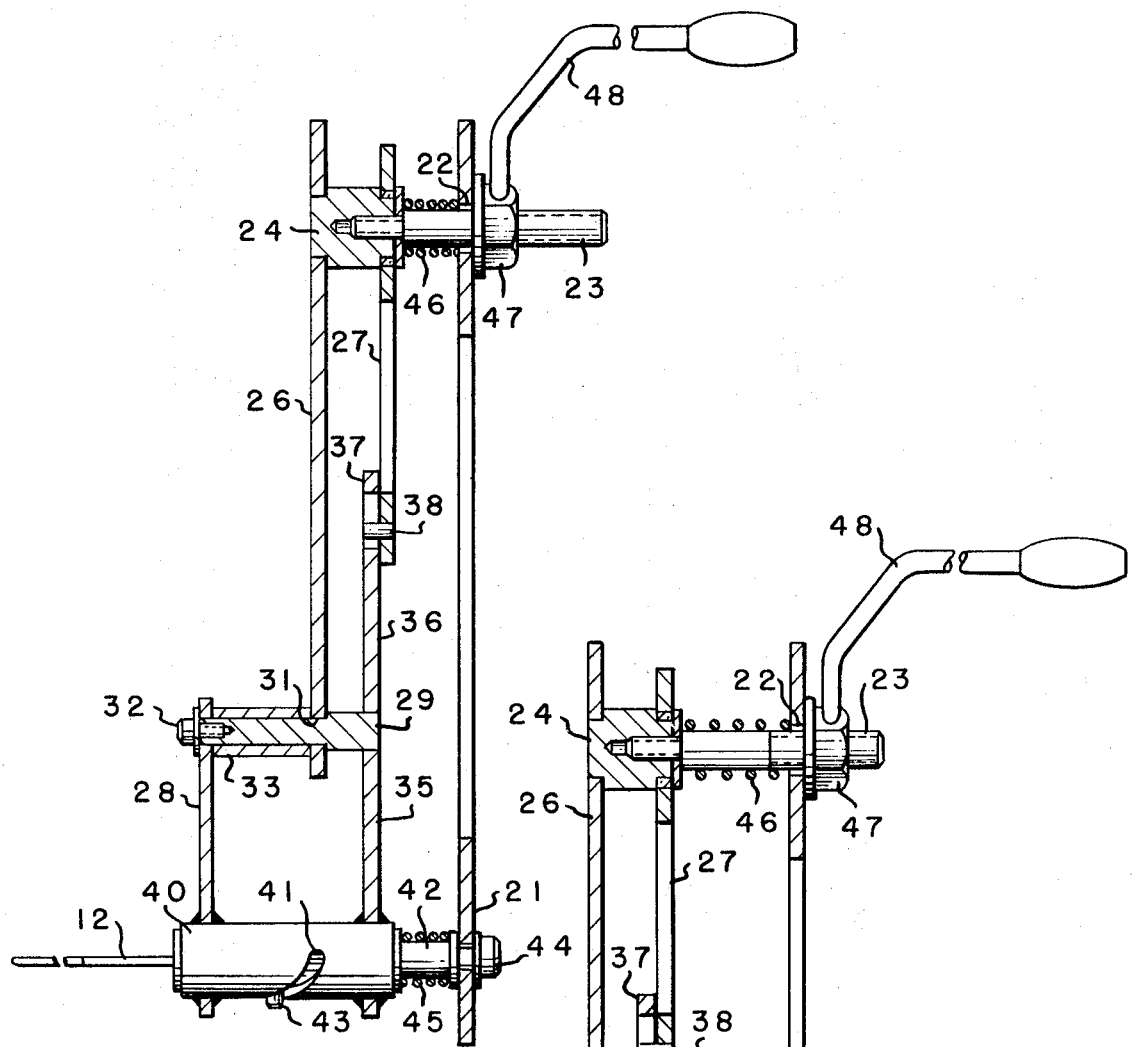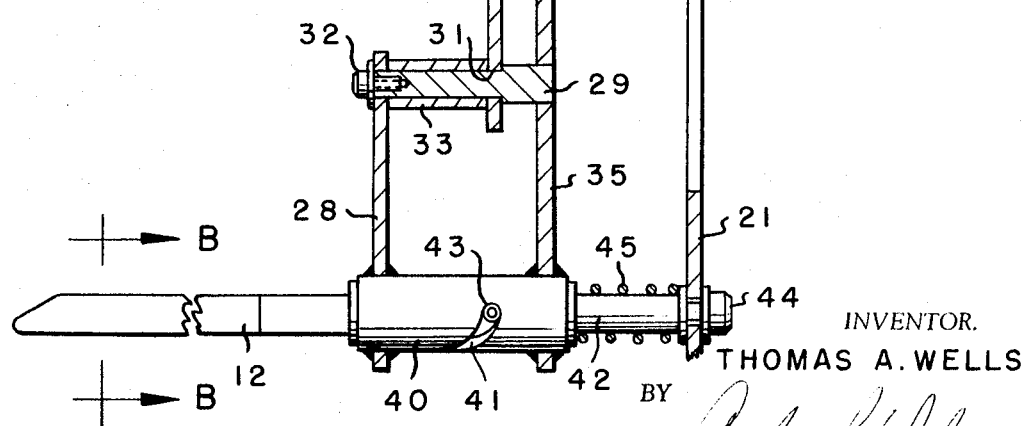

United States Patent Office 3,586,575
Patented June 22, 1971

3,586,575
APPARATUS FOR POSITIONING AN ENDLESS BELT ON A TIRE CARCASS
Thomas A. Wells, Spartanburg, S.C., assignor to Deering Milliken Research Corporation, Spartanburg, S.C.
Filed Apr. 7, 1969, Ser. No. 813,960
Int. Cl. B29h 17/24
U.S. Cl. 156—394　　　　　　　　　　　　　3 Claims

ABSTRACT OF THE DISCLOSURE

Apparatus for accurately positioning an endless belt on a tire carcass wherein a belt of a size slightly larger than the circumference of the carcass is positioned surrounding the tire carcass and spaced therefrom, and the relative size of the belt or carcass is adjusted so that the belt contacts the tire carcass.

---

It is known in the production of pneumatic tires, both the radial and bias ply construction, to apply an annular or reinforcing strip about the periphery of the tire between the tread and main body portion or carcass for better road stability and longer tread life for the tire. Such reinforcing belts are formed of relatively inextensible thread or cords such as fiber glass, which have been coated with or embedded in a suitable insulating material, e.g., rubber, a plastic or other resinous materials. Such coatings serve to prevent direct cord to cord contact while anchoring the cords in a desired belt pattern. The belts may be formed from woven fabric which preferably is bias cut and combined with rubber, e.g., in a calendering operation, and then spliced or lapped to provide an endless belt. Also, cords can be wound on a cylindrical surface in a pattern so that portions thereof extend in a zigzag pattern and at an angle with respect to the longitudinal axis of the belt. Examples of such endless belts include the types described in U.S. Pats. Nos. 2,982,327 and 3,422,874.

Since the threads or cords in the fabric usually are combined with rubber, and in many cases unvulcanized rubber which is quite tacky, it is difficult to apply an endless belt to a tire carcass and properly position the belt with respect to the carcass. It is important that the belt be placed in a position with respect to the carcass so that the belt will be centered throughout its periphery and will underlie the tread of the final tire. Also, the belt should be uniform and free from distortions throughout its circumference.

Various methods and means have been proposed to provide proper placement of an endless belt on a tire carcass. One of these employs a wand or stick which is inserted between the belt and the carcass at an angle to force the belt over the carcass as the carcass is rotated. Also, it has been proposed to employ a hollow wand with an opening at its tip and to force air through the opening so as to facilitate the relative movement of the carcass and the belt. Alternately, a wand may be used which is fitted with a series of freely rotatable sleeves to aid in the application of the belt. Although these procedures provide some assistance in the positioning of a belt on a carcass, the operation is time-consuming and requires a great deal of skilled manual labor. As a result, it has been customary heretofore to avoid the use of an endless belt and instead to construct the belt on the tire carcass by lapping a strip over the surface of the carcass and splicing or overlapping the ends thereof.

The present invention provides a novel method and apparatus for simply, conveniently and accurately applying an endless belt to a tire carcass. Furthermore, the present invention provides a method and apparatus which permits the application of an endless belt uniformly to a tire carcass with a minimum of manual labor and at a rapid rate so as to facilitate integration of the operation into an automated tire building process.

In accordance with the present invention, an endless belt is positioned on a substantially cylindrical tire carcass by a method which comprises the steps of positioning a belt of a size slightly larger than the circumference of the tire carcass, surrounding the carcass and spaced therefrom, and adjusting the relative size of the belt or carcass so the belt contacts the tire carcass.

The endless belt may be formed by continuously splicing or lapping a strip of belt material such as a bias cut fabric, or more advantageously by winding a cord over a support surface to form an endless belt such as disclosed in the above U.S. patents. By either procedure, the belt is in endless form prior to its application to the tire carcass.

The endless belt to be applied to the tire carcass may be expanded if it is necessary to enlarge the circumference thereof to properly position it surrounding the carcass. This may be accomplished by mechanically stretching the periphery of the belt such as with a plurality of fingers as hereinafter described. Another method of achieving the expansion is by the application of air pressure against the inner surface of the belt to cause stretching thereof. With this method, a plurality of tubes having openings along their length may be positioned within the periphery of the belt and air directed through the tubes and out the openings thereof against the inside surface of the belt so as to achieve the desired expansion. A different method involves the use of suction such as by employing an expandable multi-section manifold arrangement disposed about the outer surface of the belt with a plurality of suction openings adjacent to the belt. Applying suction through the openings will hold the belt in contact with the manifold and enlargement of the manifold will expand the belt.

The degree of expansion advantageously is maintained at a minimum so the subsequent relaxation of the belt will return the belt to substantially its original size. The expansion should be sufficient to enlarge the circumference of the belt so that it can be positioned over the carcass but be insufficient to stretch the belt beyond its elastic recovery point. If the belt is expanded an excessive amount, subsequent relaxation will not reduce the circumference of the belt sufficiently to achieve the desired contact with the surface of the carcass. Any stretching and/or relaxation should be substantially uniform throughout the belt circumference so distortion of the belt does not occur.

The belt is positioned about the periphery of the tire carcass by moving the belt over a carcass of slightly smaller diameter. Generally, the belt is positioned so that it is centered with respect to the carcass. Since the belt is of a larger size, the belt does not have a significant degree of contact with the carcass during the positioning step. This absence of contact facilitates adjustment of the position of the belt with respect to the carcass even though the belt and/or the carcass may have a highly tacky or adhesive surface.

After the belt is properly positioned, the belt may be relaxed to reduce the circumference thereof. This reduction in circumference causes the belt to move into contact with the tire carcass. Since the carcass and/or belt have highly tacky surfaces, the belt is secured to the carcass. Instead of relaxing the belt, it may be advantageous to expand the carcass into contact with the belt.

To the resulting assembly of the carcass and belt is applied the required sidewall and tread rubber stock, and the assembly is shaped and vulcanized to form the final tire by known procedures.

The invention will be illustrated further by reference to the accompanying drawings in which:

FIG. 1 is a schematic illustration showing a belt prior to its application to a tire carcass, FIG. 2 is a schematic illustration with the belt of FIG. 1 positioned surrounding the tire carcass, FIG. 3 is a schematic illustration showing the belt of FIG. 2 partially in contact with the tire carcass, FIG. 4 is a schematic illustration showing the belt in full contact with the tire carcass, FIG. 5 is an end view of FIG. 2 with the belt positioned over the tire carcass, FIG. 6 is an end view of FIG. 3 with the belt in partial contact with the tire carcass, FIG. 7 is an end view of one form of apparatus for the application of a belt to a tire carcass in accordance with the invention, FIG. 8 is an enlarged fragmentary view of a portion of the apparatus shown in FIG. 7, along line B—B of FIG. 9, FIG. 9 is an enlarged sectional view taken along line A—A of FIG. 7 with the apparatus in an open position, and FIG. 10 is an enlarged sectional view taken along line A—A of FIG. 7 with the apparatus in a closed position.

As shown in FIGS. 1–6, an endless reinforcement belt 11 is manually suspended over a plurality of fingers 12 positioned adjacent a substantially cylindrical tire carcass 13 disposed on a building drum 14. Drum 14 has a tapered end portion 15 to facilitate expansion of the belt 11 as it is being aligned with carcass 13. As shown in FIG. 2 after proper alignment is achieved, the fingers 12 are pivoted on their axes permitting the belt to relax. This relaxation causes the belt 11 to partially engage the carcass 13 (FIGS. 3 and 6). Thereafter, the pivoted fingers 12 are withdrawn from between the belt 11 and carcass 13 and full contact between the belt and the carcass is achieved.

Apparatus for conducting the steps schematically illustrated in FIGS. 1–6 is shown in greater detail in FIGS. 7–10. A support member 21 has a central opening 22 through which is disposed shaft 23. One end of shaft 23 is secured to a hub 24. Hub 24 has affixed thereto a plate 26 and an intermediate spider member 27. On the periphery plate 26 are positioned a plurality of belt-engaging fingers 12 through suitable linkages hereinafter described. Each finger 12 is connected to plate 26 through an arm 28 which is affixed to a pin 29 which engages one of the openings 31 in the plate 26. Each arm 28 is maintained in place with a stud 32. The spacing between arm 28 and plate 26 is fixed by housing 33 secured to plate 26 and pin 29. Pin 29 projects through plate 26 to a bell crank consisting of arms 35 and 36. Arm 36 has a slot 37 in one end thereof which engages pin 38 affixed to intermediate support 27. Several arms 36 have springs 39 attaching them to plate 26 to urge the fingers 12 toward the axis of the apparatus.

The individual finger 12 is mounted for rotation in a sleeve 40 which has a cam opening 41. Shaft 42 which supports a finger 12 has a cam follower 43 engaging the cam opening 41. Spacing between support 21 and intermediate spider 27 is maintained through coil springs 45 disposed about the shafts 42 and a spring 46 disposed about shaft 23. The relative position of the shafts 42 with respect to the support 21 is maintained with studs 44. A nut 47 with a handle 48 is threaded on shaft 23.

In the operation of the apparatus shown in FIGS. 7–10, handle 48 is turned in a counterclockwise direction moving nut 47 along shaft 23 so support member 21 is moved by the force of springs 45 and 46. Since shafts 42 are secured to support member 21 while permitted to rotate therein, the movement of support 21 causes shafts 42 to be drawn from sleeves 40 with the result that pins 43 in shafts 42 slide along cam openings 41 and rotate the position of fingers 12 so the fingers are disposed substantially radially of the axis of the apparatus. Application of a belt over the fingers and the transfer of the belt to a building drum is accomplished as described above with reference to FIGS. 1–6 of the drawings. Springs 39 urge the fingers against the tapered end portion 15 of the drum 13 to insure a proper fit on the drum. Proper positioning of the belt may be achieved by moving plate 26 against the outer end of tapered portion 15. After the belt is disposed over the carcass as shown in FIG. 2, the handle 48 is turned in a clockwise direction rotating nut 47 on shaft 23 and forcing support member 21 into a closer relationship with respect to plate 26 and intermediate spider 27. This action causes the shafts 42 to move relative to sleeves 40 with the result that pins 43 travel along cam openings 41 so that fingers 12 rotate approximately 90° to a substantially tangential position with respect to the axis of apparatus. Thereafter, as described in reference to FIGS. 3 and 4 of the drawings above, the belt is permitted to relax, and the circumference is reduced. This relaxation causes the belt to contact the carcass as shown in FIG. 6, and the fingers can be removed from between the belt and the carcass.

It will be apparent from the above description and drawings that the present invention provides a novel method and apparatus for simply, conveniently and accurately applying an endless belt to a tire carcass. The method and apparatus of the invention permit the rapid application of and endless belt uniformly to a tire carcass without distortion of the belt and with a minimum of manual labor. Thus, the method and apparatus of the invention facilitate integration of the belt mounting operation into an automated tire building process.

While the invention has been illustrated particularly with reference to the apparatus shown in the drawings, it is apparent that various modifications may be made in the detailed description within the invention. As described above, gas pressure may be utilized to expand the belt. Also, the carcass can be expanded to contact the surrounding belt. In these alternatives, as well as others which will occur to those skilled in the art from the above description and drawings, an endless belt of a size slightly larger than a tire carcass is positioned surrounding the tire carcass. Thereafter, the relative size of the belt or carcass is adjusted so that the belt contacts the carcass. In view of the possible modifications, it is intended that the invention be limited only by the following claims.

That which is claimed is:

1. Apparatus for positioning an endless belt on a tire carcass including a support member positioned transversely of the axis of said apparatus, a plurality of fingers having cross sections with elongated axes disposed about the periphery of said support member and extending therefrom substantially parallel to the axis of said apparatus, said fingers being rotatable on their respective axes from positions in which their elongated axes are substantially radial of the axis of said apparatus to positions in which their elongated axes are substantially tangential of the axis of said apparatus, and means for rotating said fingers on their respective axes.

2. Apparatus according to claim 1 wherein said means for rotating said fingers includes means for coordinating such rotation.

3. Apparatus according to claim 1 wherein said fingers are biased toward the axis of said apparatus.

References Cited
UNITED STATES PATENTS

| | | | | |
|---|---|---|---|---|
| 1,455,260 | 5/1923 | Midgley | 156—126 |
| 1,734,023 | 10/1929 | Smith | 156—126 |
| 1,785,659 | 12/1930 | State | 156—126 |
| 2,517,889 | 8/1950 | Kuffler | 156—126 |
| 2,936,813 | 5/1960 | Haase | 156—126 |
| 3,219,510 | 11/1965 | Frazier | 156—127 |
| 3,332,820 | 7/1967 | Porter | 156—126 |

BENJAMIN A. BORCHELT, Primary Examiner

S. C. BENTLEY, Assistant Examiner